3,077,711
Patented Feb. 19, 1963

3,077,711
HYDROCARBON SEPARATION
Earle C. Makin, Jr., El Dorado, Ark., assignor to Monsanto Chemical Company, St. Louis, Mo., a corporation of Delaware
No Drawing. Filed May 20, 1960, Ser. No. 30,425
10 Claims. (Cl. 55—84)

The present invention relates to the separation of a mixture of two or more hydrocarbons according to the degree of saturation of the components of the mixture. More particularly, the present invention relates to the separation of poly-olefins from mono-olefins by the selective absorption of the more unsaturated poly-olefins in a solvent. Specifically, this invention relates to the separation of $C_4$ poly-olefins from $C_4$ mono-olefins using a solvent in which the more unsaturated $C_4$ poly-olefins are selectively absorbed.

Many hydrocarbon mixtures are impossible to separate by the distillation and many more are only separable through use of elaborate and costly distillation apparatus and procedures. Solvent extraction is one of the separation methods which may be substituted, in many cases, for distillation. This separation method uses a solvent compound in which one or more of the compounds of a given mixture are selectively absorbed. The choice of the solvent compound is then the most important aspect of a solvent extraction program.

It is then an object of this invention to provide a solvent for the separation of mixtures of two or more compounds. It is more particularly an object of this invention to provide a solvent for the selective absorption of the more unsaturated hydrocarbons from hydrocarbon mixtures containing compounds of varying degrees of unsaturation. A still more specific object of this invention is to provide a solvent for the separation of $C_4$ poly-olefins from $C_4$ mono-olefins and $C_4$ saturated hydrocarbons. Additional objects will become apparent from the description of the invention herein disclosed.

In fulfillment of the objects cited above, it has been found that butadiene sulfone ethers can be used to effectively separate hydrocarbon mixtures containing paraffinic, mono-olefinic and poly-olefinic hydrocarbons into fractions of varying degrees of unsaturation. These butadiene sulfone ethers have the general formula

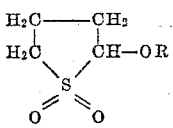

wherein R is an alkyl radical of 1 to 16 carbon atoms. The —OR substituent may be in the meta position to the sulfur as well as in the ortho position.

To illustrate the new and unexpected results which may be obtained from the use of the solvents which are the subject of this invention, the following examples are presented. It is to be understood, of course, that these examples are in no way to be construed as limiting the applications, conditions or operation of this invention.

EXAMPLE I

A $C_4$ hydrocarbon stream comprising 6.0 volume percent iso-butanes, 52.4 volume percent n-butane, 18.1 volume percent butenes and 23.5 volume percent butadiene 1,3 was passed through a U-shaped tube packed with glass beads and containing five milliliters of n-butoxy butadiene sulfone. The volume of the $C_4$ stream passed through the U tube was approximately 100 milliliters. The gas was passed back and forth through the solvent until an equilibrium between the dissolved and the undissolved gas was obtained. The undissolved gas was then analyzed and found to have a new composition of 11.0 volume percent butadiene 1,3, 16.0 volume percent butenes, 62.8 volume percent n-butane and 10.2 volume percent iso-butanes. The amount of the gas dissolved in the solvent represented 53 volume percent of the total feed gas volume.

EXAMPLE II

The feed gas of Example I was passed through a solvent in the same manner and under the same conditions as to volume as in Example I. The solvent, however, was n-octoxy-butadiene sulfone. In this case, the ratio of dissolved butadiene 1,3 to butene was found to be 2.3 to 1 as compared to 1.78 to 1 with the solvent in Example I.

To further illustrate the invention herein disclosed, Table I is presented showing the Bunsen coefficient ratio between butadiene and butenes for butadiene sulfone ethers in which the alkyl group contains varying numbers of carbon atoms. The Bunsen coefficient is the ratio of the volume of gas soluble in the solvent to a given volume of solvent.

Table I

| Number of carbon atoms in the alkyl group: | Bunsen coefficient ratio of butadiene to butenes |
|---|---|
| 1 | 1.90 |
| 2 | 1.55 |
| 3 | 1.63 |
| 4 | 1.78 |
| 5 | 1.89 |
| 6 | 2.03 |
| 7 | 2.14 |
| 8 | 2.30 |

The solubility characteristics of these solvents are shown in Table II. The solubility presented in this table is based upon the total unsaturated hydrocarbon solubility in the solvent.

Table II

| Number of carbon atoms in the alkyl group: | Total solubility of unsaturated hydrocarbon in solvent |
|---|---|
| 1 | 3.75 |
| 2 | 5.1 |
| 3 | 5.5 |
| 4 | 5.75 |
| 5 | 5.56 |
| 6 | 5.30 |
| 7 | 5.20 |
| 8 | 5.0 |

The solvents of this invention may be prepared according to any known method such as the method of Delfs in U.S. 2,291,798. The general formula of these solvents is

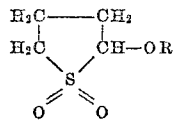

wherein R is an alkyl radical of 1 to 16 carbon atoms. It is within the scope of this invention, however, for similar ethers having the ether group in the meta position to the sulfur to be used as selective solvents or a mixture of these isomers may be used. The butadiene sulfone ethers of this invention may contain a total of 5 to 20 carbon atoms. However, a more preferred range would be from approximately 8 to 13 carbon atoms.

The solvents of this invention may be used singly or in combination, one with another. Also, they may be used in conjunction with a great number of co-solvents or modifying solvents. The solvents of this invention when used with auxiliary solvents may range in concentration in the solvent mixture from about 10 to about 99 percent of the total mixture.

The hydrocarbon mixtures which may be effectively separated with the solvents of this invention are those containing hydrocarbons of varying degrees of unsaturation and containing not more than 5 carbon atoms. The hydrocarbons of varying degrees of unsaturation which may be separated one from another are acetylenes, alkadienes, alkylenes, and paraffins. A preferred feed stream for the practice of the invention herein disclosed is one containing two or more hydrocarbons of four carbon atoms and selected from the group comprised of butadienes, butenes, and butane.

In the practice of this invention the temperature and pressure are not of critical importance. As the temperature is decreased the solubility of the unsaturated gases in the solvent increases. This is offset, however, by a decrease in selectivity for the more unsaturated poly-olefinic compounds. Room temperatures are preferred. The pressure at which the invention is practiced will have less effect than the temperature and is preferred to be at approximately atmospheric, although higher pressures may be used, e.g. up to 200 p.s.i. and higher.

The ratio of solvent to feed mixture, for the practice of this invention, may range from 0.01 to 5 volumes of solvent per gaseous volume of hydrocarbon feed. A more preferred range would be from 0.02 to .5 volume of solvent per gaseous volume of hydrocarbon feed. The optimum solvent to feed ratio, of course, will be dependent upon the identity and quantity of unsaturated material in the hydrocarbon feed stream. An example of a desired solvent to feed ratio for a specific feed stream is as follows: 0.03 to 0.07 volume of solvent per gaseous volume of a hydrocarbon feed stream comprising 50 to 65 volume percent saturated hydrocarbons and 20 to 25 percent poly-olefinic hydrocarbons, the remainder being mono-olefinic hydrocarbons.

The method of contacting the solvents of this invention with the $C_4$ hydrocarbon stream may be by any of the conventional methods. The primary concern is to obtain the best possible contact between solvent and hydrocarbons. Such conventional methods as counter-current or co-current flow of solvent to hydrocarbon or passage of the hydrocarbon gas through a stationary head of solvent may be used.

What is claimed is:

1. In the process of separating a hydrocarbon stream comprised of hydrocarbons of not more than 5 carbon atoms into fractions of varying degrees of unsaturation using a solvent selective for the more unsaturated hydrocarbons, the improvement which comprises using as a solvent a heterocyclic butadiene sulfone ether of 5 to 20 carbon atoms.

2. In the process of separating a hydrocarbon stream comprised of hydrocarbons of not more than 5 carbon atoms into fractions of varying degrees of unsaturation using a solvent selective for the more unsaturated hydrocarbons, the improvement which comprises using as a solvent a compound of the general formula

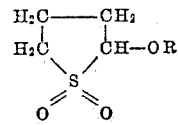

wherein R is an alkyl radical of 1 to 16 carbon atoms.

3. The process of claim 2 wherein the hydrocarbon stream is comprised of $C_4$ hydrocarbons.

4. The process of separating butadiene from butenes by selectively absorbing the butadienes in a solvent of the general formula

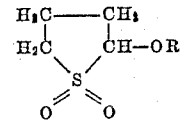

wherein R is an alkyl radical of 1 to 16 carbon atoms.

5. The process according to claim 4 wherein the solvent is n-butoxy butadiene sulfone.

6. The process according to claim 4 wherein the solvent is n-pentoxy butadiene sulfone.

7. The process according to claim 4 wherein the solvent is n-hexoxy butadiene sulfone.

8. The process according to claim 4 wherein the solvent is n-heptoxy butadiene sulfone.

9. The process according to claim 4 wherein the solvent is n-octoxy butadiene sulfone.

10. In the process of separating a hydrocarbon stream comprised of hydrocarbons of not more than 5 carbon atoms into fractions of varying degrees of unsaturation using a solvent selective for the more unsaturated hydrocarbons, the improvement which comprises using as a solvent a compound of the general formula:

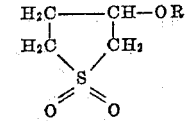

wherein R is an alkyl radical of 1 to 16 carbon atoms.

References Cited in the file of this patent

UNITED STATES PATENTS 2,357,344    Morris et al. _____ Sept. 5, 1944

FOREIGN PATENTS 448,898    Canada _____ June 1, 1948